US012160153B2

(12) United States Patent
Corbin

(10) Patent No.: US 12,160,153 B2
(45) Date of Patent: Dec. 3, 2024

(54) CURVILINEAR ELECTROMAGNETIC PUMP

(71) Applicant: TerraPower, LLC, Bellevue, WA (US)

(72) Inventor: Robert A Corbin, Duvall, WA (US)

(73) Assignee: TERRAPOWER, LLC, Bellevue, WA (US)

(*) Notice: Subject to any disclaimer, the term of this patent is extended or adjusted under 35 U.S.C. 154(b) by 637 days.

(21) Appl. No.: 17/220,915

(22) Filed: Apr. 1, 2021

(65) Prior Publication Data
US 2022/0051820 A1  Feb. 17, 2022

Related U.S. Application Data

(60) Provisional application No. 63/066,785, filed on Aug. 17, 2020.

(51) Int. Cl.
H02K 44/06 (2006.01)
F04B 17/03 (2006.01)
F04B 19/04 (2006.01)
G21C 13/04 (2006.01)
G21C 1/32 (2006.01)
G21C 3/33 (2006.01)
G21C 9/00 (2006.01)
G21C 15/12 (2006.01)
G21C 15/18 (2006.01)

(52) U.S. Cl.
CPC ............ H02K 44/06 (2013.01); F04B 17/03 (2013.01); F04B 19/04 (2013.01); G21C 13/04 (2013.01); G21C 1/326 (2013.01); G21C 3/33 (2013.01); G21C 9/00 (2013.01); G21C 15/12 (2013.01); G21C 15/185 (2019.01)

(58) Field of Classification Search
CPC ........ H02K 44/02; H02K 44/04; H02K 44/06; F04B 17/03; F04B 19/04; F04B 19/006
USPC ............................................................ 417/50
See application file for complete search history.

(56) References Cited

U.S. PATENT DOCUMENTS 2,730,951 A * 1/1956 Donelian ................ F04D 7/065
                                                        310/11
3,715,270 A    2/1973 Jackson
               (Continued)

FOREIGN PATENT DOCUMENTS

CN     107689255 A    2/2018
WO     2020036361 A1  2/2020

OTHER PUBLICATIONS

PCT/US2021/025477 International Preliminary Report on Patentability dated Feb. 16, 2023.

Primary Examiner — Bryan M Lettman
(74) Attorney, Agent, or Firm — FisherBroyles, LLP; Jeremy P. Sanders

(57) ABSTRACT

A curvilinear electromagnetic pump is configured to follow a curve, such as by coupling multiple linear pump segments together that are offset by an angle with respect to each other. The curvilinear electromagnetic pump can curve within two dimensions, or within three dimensions. The curvilinear electromagnetic pump allows for more efficient arrangement of components and systems within a nuclear reactor vessel and allows a significantly reduced reactor vessel height as compared to a linear pump arranged vertically. The curvilinear electromagnetic pump may follow the curvature of the reactor vessel wall and may be entirely disposed near the bottom of the reactor vessel.

11 Claims, 8 Drawing Sheets

(56) References Cited

U.S. PATENT DOCUMENTS

| | | | | |
|---|---|---|---|---|
| 4,449,890 A | * | 5/1984 | Barzantny | H02K 44/06 417/50 |
| 4,668,170 A | * | 5/1987 | Barzantny | H02K 44/06 310/11 |
| 4,773,826 A | * | 9/1988 | Mole | G21C 15/247 976/DIG. 201 |
| 4,802,531 A | * | 2/1989 | Nathenson | F28D 7/1653 165/104.23 |
| 4,808,080 A | * | 2/1989 | Alexion | G21C 15/247 376/404 |
| 8,480,377 B2 | * | 7/2013 | Ciocanel | H02K 41/03 204/600 |
| 11,276,503 B2 | | 3/2022 | Cisneros, Jr. et al. | |
| 2016/0273540 A1 | | 9/2016 | Mauvais et al. | |
| 2017/0162283 A1 | * | 6/2017 | Loewen | H02K 44/06 |

* cited by examiner

CURVILINEAR ELECTROMAGNETIC PUMP

CROSS-REFERENCE TO RELATED APPLICATIONS

This application claims the benefit of U.S. Provisional Patent Application No. 63/066,785, filed Aug. 17, 2020, entitled "CARTRIDGE CORE BARREL FOR NUCLEAR REACTOR," the contents of which is incorporated herein by reference in its entirety.

BACKGROUND

Electromagnetic (EM) pumps utilizing the electrical conductivity of liquid metals such as sodium or a sodium-potassium alloy are known. EM pumps typically have no moving parts which provides simplicity and reliability over conventional mechanical pumps. However, EM pumps are relatively large in size in comparison to their mechanical counterparts for pumping a similar volumetric flow rate. Various types of EM pumps have been developed including helical magnetic pumps, annular linear induction pumps, centrifugal electromagnetic pumps, and flat linear induction pumps.

Typically, an electromagnetic pump is arranged vertically within a reactor vessel and pumps liquid metal from a cold pool near the bottom of the reactor vessel upward to a high-pressure upper outlet coupled to a pump discharge. The pump discharge includes piping that returns the liquid metal to the bottom of the reactor vessel where it enters the reactor core through an inlet plenum.

In order to meet the flow demands of a nuclear reactor, and because electromagnetic pumps have a relatively low efficiency, an electromagnetic pump is typically quite large in order to generate the necessary pumping force. In many cases, the length of the electromagnetic pump required to generate the necessary pumping force is at least partially responsible for the height of the reactor vessel, which must contain the electromagnetic pump along with the other reactor internals.

Accordingly, it would be a significant advantage to have a pump that did not dictate the height of the reactor vessel, but rather, allowed more flexibility in the location and orientation of components and systems within the reactor vessel while still providing the necessary pumping force to circulate liquid metal within the reactor vessel. Moreover, an improved pump may allow a reactor vessel to have a significantly reduced height as compared with typical reactor vessels using electromagnetic pumps.

These, and other advantages, will become apparent by reference to the following description and appended figures.

SUMMARY

According to some embodiments, a nuclear reactor includes a reactor vessel; a reactor core within the reactor vessel; a heat exchanger within the reactor vessel; and a curvilinear electromagnetic pump. The curvilinear electromagnetic pump includes a plurality of linear segments wherein a first linear segment is offset by a predetermined angle with respect to a second linear segment. The curvilinear electromagnet pump is in fluid communication with the heat exchanger and the reactor core and configured to receive a fluid from the heat exchanger and deliver the fluid to the reactor core.

In some examples, the reactor vessel is generally cylindrical shaped, and the curvilinear electromagnetic pump may have a shape that curves to follow the shape of the reactor vessel.

In some embodiments, the curvilinear electromagnetic pump defines a centerline that lies in a single plane. The centerline may curve within the place. In some cases, the curvilinear electromagnetic pump defines a centerline that curves in three dimensions.

The curvilinear electromagnetic pump may be a single stator configuration or may be a double stator configuration.

In some examples, the reactor vessel has a geometric center, and the curvilinear electromagnetic pump may be disposed below the geometric center. In other words, in some cases, the curvilinear magnetic pump lies entirely below the geometric center of the reactor vessel.

According to some embodiments, a curvilinear electromagnetic pump includes a first pump section, the first pump section having a first pump housing, a first linear fluid flow channel, and a first collection of outer stators, the first collection of outer stators configured to be electrically driven to create a moving magnetic field; a second pump section, the second pump section having a second pump housing, a second linear fluid flow channel, and a second collection of outer stators, the second collection of outer stators configured to be electrically driven to create the moving magnetic field; and wherein the second pump section is coupled to the first pump section and is offset by an angle with respect to the first pump section.

In some cases, a coupler is configured to fluidically connect the first pump section and the second pump section together at the angle. The coupler may be wedge shaped to define an offset angle between the first pump section and the second pump section.

In some cases, the coupler includes a third outer stator, the third outer stator configured to be driven sequentially with the first collection of outer stators and the second collection of outer stators to cause the moving magnetic field to travel along the first pump section, the coupler, and the second pump section.

The first linear fluid flow channel may be in fluid communication with the second linear fluid flow channel.

In some cases, the angle is from 5° to 30°. That is, a first pump segment defines a linear centerline that is offset with respect to a centerline of the second pump segment by and offset angle within the range of from about 5° to about 30°.

In some cases, a centerline of the curvilinear electromagnetic pump is orientated within a horizontal plane.

The first pump section may further include a first collection of inner stators and the second pump section may further include a second collection of inner stators.

In some embodiments, the curvilinear electromagnetic pump is positioned within a nuclear reactor vessel and the curvilinear electromagnetic pump is configured to follow a curve of a wall of the nuclear reactor vessel. The wall of the nuclear reactor vessel may be cylindrical, and the pump may follow the curvature of the cylindrical wall.

In some instances, the nuclear reactor vessel defines a geometric center, and the curvilinear electromagnetic pump is entirely disposed below the geometric center. The curvilinear electromagnetic pump may be located near the bottom of the reactor vessel and have a fluid inlet and a fluid outlet that are below the geometric center.

The curvilinear electromagnetic pump may have an inlet in fluid communication with a heat exchanger and an outlet in fluid communication with an inlet plenum of a reactor core.

In some cases, the curvilinear electromagnetic pump includes a third pump section, the third pump section having a third pump housing, a third linear fluid flow channel, and a third collection of outer stators, wherein the third pump section is coupled to the second pump section and is offset by the angle with respect to the second pump section.

In some cases, a centerline of the curvilinear electromagnetic pump is not planar. In some examples, the curvilinear electromagnetic pump follows an arc, such as an arc defined by a wall of the nuclear reactor vessel.

DETAILED DESCRIPTION

This disclosure generally relates to configuration and arrangements of electromagnetic pumps, and in particular, to a curvilinear electromagnetic pump that can be used where space is limited or to reduce the overall envelope of the components. While the following description is useful in the design and configuration of a sodium-cooled fast reactor (SFR), many of the concepts disclosed herein may be equally applicable to other reactor types, and the disclosure should not be limited to SFR technology unless specifically stated.

Figure 1A:
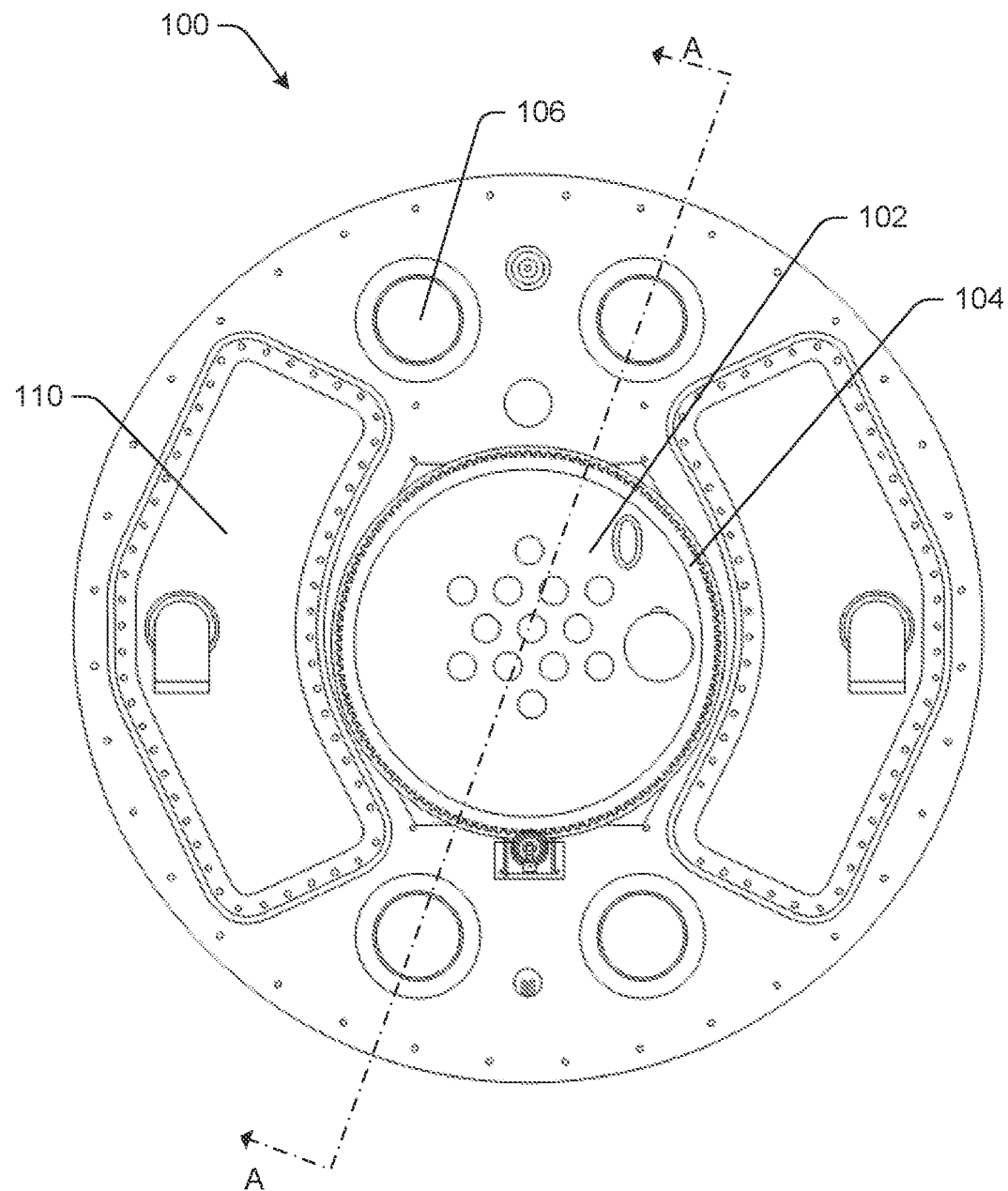
FIG. 1A is a top schematic representations of a typical sodium fast reactor showing the layout of the systems in the reactor vessel, in accordance with some embodiments.
Figure 1B:
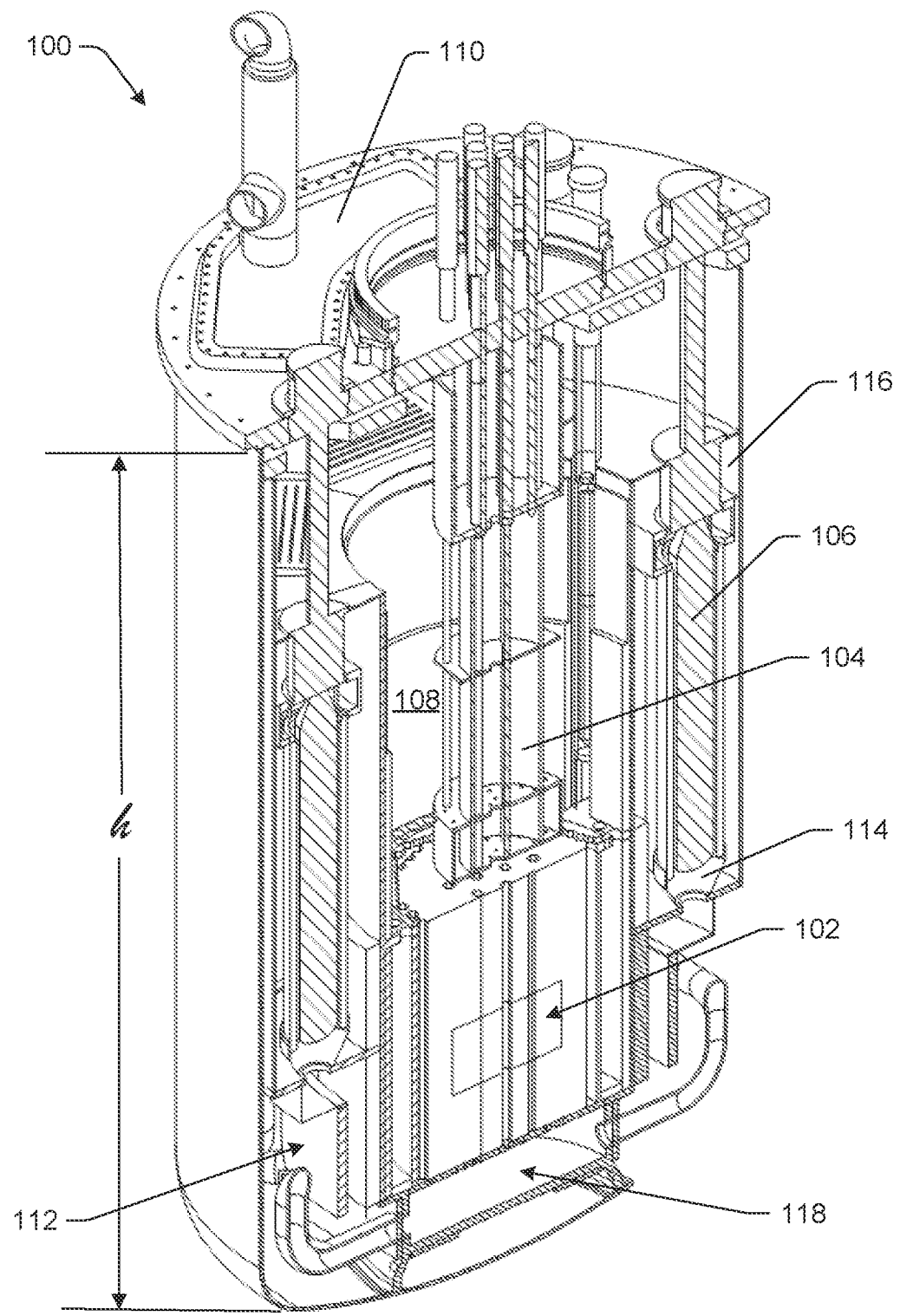
FIG. 1B is an elevational cross-sectional schematic representations of a typical sodium fast reactor taken along the line A-A of FIG. 1A, showing the layout of the systems in the reactor vessel, in accordance with some embodiments.

FIGS. 1A and 1B illustrate a reactor vessel 100 having a core 102, an in-vessel storage system (IVS) 104, and electromagnetic pumps 106. FIG. 1B is a cross-sectional view taken along the line A-A of FIG. 1A. This may represent a typical configuration in which the core 102 may include a support cylinder that houses a core former ring, core barrel, IVS 104, and shielding, and is typically centrally located within the vessel 100 with other vessel systems disbursed concentrically about the core 102. The IVS 104 is typically coupled to the core barrel and provides a storage space to support the changing (e.g., refueling, shuffling, etc.) of core assemblies. In some embodiments, the core assemblies include fuel pins, control rods, neutron reflectors, neutron absorbers, or other components configured to fit within the IVS and be selectively inserted into, and removed from, the core. Additional details of these components are not germane to the instant description and are therefore not further described.

During normal operation, heat generated in the reactor core 102 heats up a primary coolant, which in some cases, is liquid sodium. The sodium passes upwardly through the reactor core 102 and discharges into a sodium hot pool 108 above the reactor core 102. Sodium from the hot pool 108 enters a heat exchanger 110 and dissipates heat to a secondary coolant passing through the heat exchanger 110. In some cases, the secondary coolant may be sodium, molten salt, or some other flowing coolant.

Once the sodium from the hot pool 108 passes through the heat exchanger 110, the liquid sodium exits the heat exchanger into a cold pool 112 below the heat exchanger 110. In some embodiments, sodium in the cold pool 112 enters an electromagnetic sodium pump 106 by pump inlets 114 positioned toward the lower end of the pumps 106. The electromagnetic sodium pumps 106 pump the sodium upwardly to a high-pressure upper outlet 116 that is sealed against mixing with sodium in the hot pool 108. The high-pressure upper outlet 116 couples to a pump discharge and piping that returns the sodium to the inlet of the reactor core 118.

According to some embodiments, the electromagnetic pumps 106 may be reversed so that the inlet is near a top end of the pump, and an outlet is adjacent a lower end of the pump. Either configuration is equally applicable for the embodiments discussed herein.

In many cases, the height h of the reactor vessel 100 is determined, at least in part, by the vertical height of the electromagnetic pump 106. The electromagnetic pump 106 may be sized to create a desirable net positive suction head (NPSH) and a volumetric flow of coolant through the reactor vessel 100. In some cases, the electromagnetic pump 106 has a desired length in order to create the necessary magnetohydrodynamic forces required to achieve the desired circulation characteristics.

In some cases, electromagnetic pumps 106 are used for transporting fluids with high electrical conductivity, such as sodium, for example. In particular, electromagnetic pumps do not have bearings or any moving parts, thus simplifying their operation and reducing maintenance requirements compared with mechanical pumps.

In general, an electromagnetic pump operates based upon the Fleming's left-hand rule: when a current carrying conductor comes under a magnetic field, there will be a force acting on the conductor. For example, a pump uses electricity to move an electrically conductive fluid. A magnetic field is set at right angles to the direction of the fluid flow and a current is passed through it. The result is an electromagnetic force that moves the liquid through the pump.

Electromagnetic pumps are known in the art, and typically include an outer stator and an inner central core. An electromagnetic pump operates on the principle that a force is exerted on a current-carrying conductor in a magnetic field. A high electrical conductivity of the flowing fluid (e.g., sodium, lithium, potassium, or metallic alloys), allows a plumping force to be developed when it is present within a duct and subjected to a magnetic field and to an electric current. These types of pumps have operated to pump thousands of gallons per minute without moving parts or required maintenance.

While any suitable electromagnetic pump may be utilized within the scope of the present disclosure, such as, for example, DC conduction pumps, AC conduction pumps, stationary magnet structures, rotating magnet structures, single-phase induction, poly-phase induction, single-stator pumps, double-stator pumps, flat linear induction, annular linear induction, helical induction, or pumps using electromagnets or permanent magnets. The disclosed concepts and embodiments are applicable to any suitable electromagnetic pump now known or later developed, and the disclosure herein should not be limited to any specific configuration of pump, unless specifically stated.

One particular pump configuration that has proven suitable as a primary coolant pump in an SFR, is an annular linear induction pump (ALIP). In some cases, an ALIP has been selected because of its reduction in size as compared to a DC conduction pump, even though the DC conduction pump has a higher efficiency. However, even though an ALIP pump is significantly smaller than a DC conduction pump providing similar flow characteristics, an ALIP pump is still relatively large and, in some cases, is a driving factor in the height of a reactor vessel. By reducing the height of the pump, a corresponding reduction to the height of the reactor vessel may be realized.

Historically, an ALIP pump is situated vertically within a reactor vessel, as shown in FIG. 1B, and its height is typically dictated by the flow characteristics required within the reactor vessel.

ALIPs typically include an annular liner flow channel or duct surrounded by a column composed of alternating annular stator coils and magnetic stator iron. In some cases, a double-stator system includes an inner stator arrangement disposed concentrically and enclosed within the pump central linear liquid flow duct. A second stator column may also include alternating annular coils and magnetic stator iron. With the double-stator configuration, both columns of stators act upon the liquid linearly passing through the annular flow duct.

In some cases, the double-stator arrangement provides a greater pumping capacity per pump unit size and has the further advantage of reducing heat transmitted to the sodium from magnetic induction heating. In some cases, the electromagnetic pump is used to pump cold fluid after it has exited the primary heat exchanger and routes the cold fluid to the core inlet. Accordingly, it may be desirable to limit any induction heating of the cold fluid in order to maintain a desirable ΔT between the hot pool and the cold pool.

Figure 2:
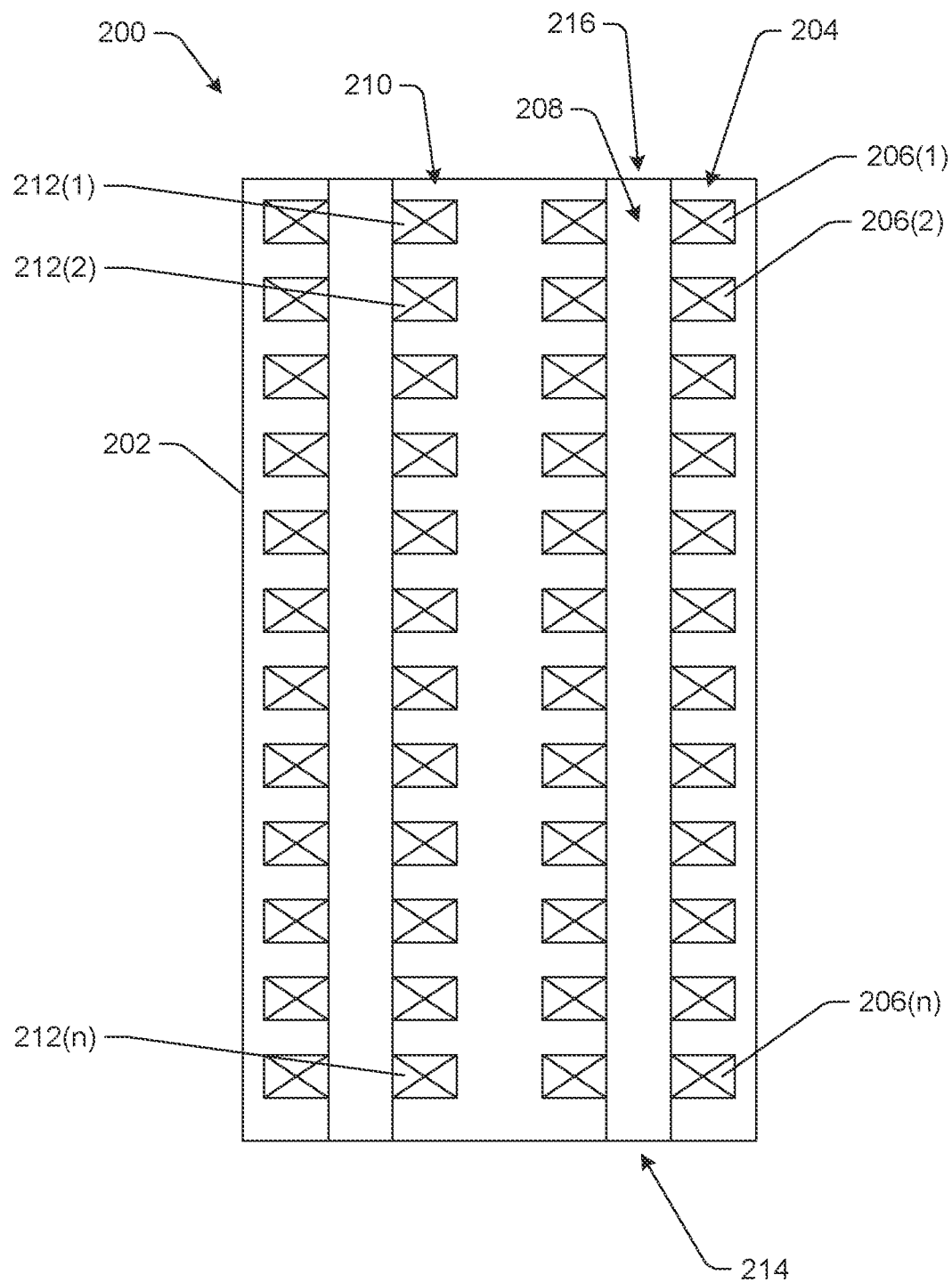
FIG. 2 illustrates a schematic representation of a double-stator linear electromagnetic pump, in accordance with some embodiments.

FIG. 2 illustrates a schematic representation of a double-stator annular linear induction pump 200. An electromagnetic pump 200 generally comprises a pump housing 202, which may be cylindrical, encloses the electromagnetic induction system and provides the necessary protection to allow the pump 200 to operate submerged. An outer stator assembly 204 includes a collection of outer stators 206(1), 206(2), ... 206(n), is posited between the pump housing 202 and the annular flow channel 208. The outer stator assembly may include a plurality of alternately stacked annular stator units having stator magnetic irons and stator coils, as is known in the art. In some cases, stator iron rigs and stator coils are alternately stacked forming a concentric ring about the annular flow channel 208.

An inner stator assembly 210 includes a collection of inner stators 212(1), 212(2), ... 212(n) and is positioned within the annular flow channel 208. The outer stator assembly 204 and the inner stator assembly 210 may be similarly constructed and wired. In use, an input voltage, generally comprising a 3-phase alternating current is provided to the stator assemblies 204, 210. The current is provided in order to generate a traveling magnetic field along the stator assemblies, which in turn, generates an electrical current on the surface of the liquid metal within the annular flow channel 208 and generates an electromagnetic force that causes the liquid metal to move through the annular flow channel 208.

In some cases, an electromagnetic pump 200 has an inlet 214 at one end and an outlet 216 at an opposing end. In some cases, the electromagnetic pump 200 is submerged into a fluid such that the fluid enters the annular flow channel 208 by virtue of being submerged in the fluid. Upon application of a phased electrical current, a magnetic field is created and conveyed from the inlet 214 to the outlet 216, and as a result, the electrically conductive fluid is likewise conveyed from the inlet 214 to the outlet 216.

An electromagnetic pump 200 can be customized through electrical variables, such as input current voltage, frequency, number of coil turns, and pole pitch, which can be determined from the number of pole pairs of the moving magnetic field and core length. In some cases, the stator packs are referred to as coil packs, and the terms may be used interchangeably. The number of coil packs can be determined based upon the required length of the electromagnetic pump 200 and the input current. In some cases, a polyphase electrical power current is applied in which three or more energized electrical conductors carry alternating current with defined phase angles between the voltage waves in each conductor. For example, in a three-phase system, the phase angle is 120°. The application of a polyphase current is a rotating magnetic field that can be sequentially applied to the coil packs 204, 210 along the length of the electromagnetic pump 200.

A feature that electromagnetic pumps have in common, regardless of their type or configuration, is that the pumped fluid flows linearly through a linear fluid duct. The duct may be annular, have a circular cross-section, a rectangular cross-section, an ovoid cross-section, or any other suitable geometry; however, the fluid duct is linear along its length. Consequently, when installing an electromagnetic pump in a confined space, such as, for example, within a nuclear reactor vessel, it can be difficult to arrange all the reactor internals to allow for proper placement of the electromagnetic pump. Furthermore, the required height of the electromagnetic pump within a reactor vessel dictates, at least in part, the placement of other components. For example, in some cases, the electromagnetic pump typically has an inlet near a lower end of the pump that draws in fluid from the cold pool, and an outlet near an upper end of the pump that drives fluid into a heat exchanger. Consequently, the heat exchanger is typically located high up within the reactor vessel near the outlet of the electromagnetic pump.

Figure 3:
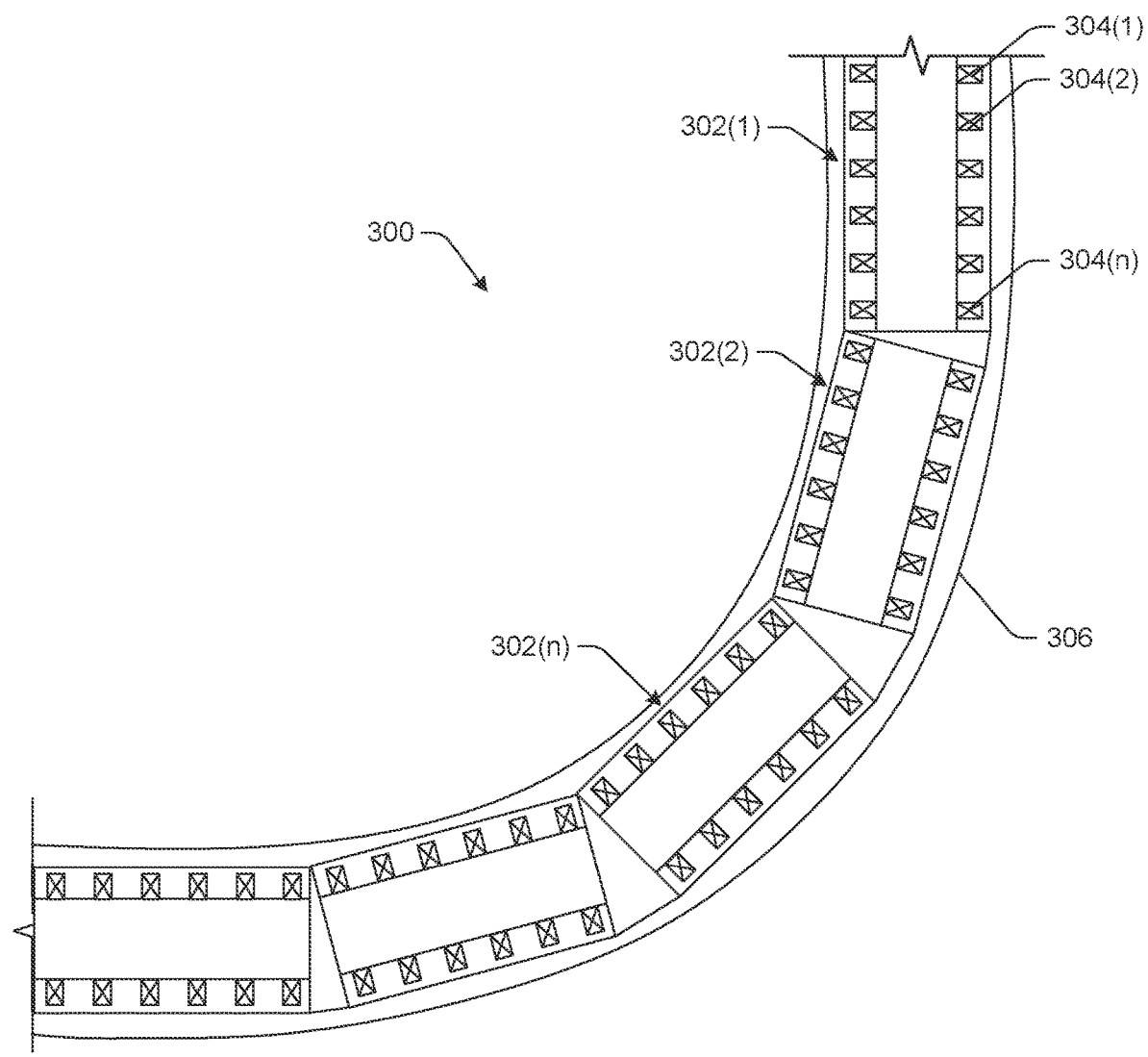
FIG. 3 illustrates a schematic representation of a curvilinear electromagnetic pump, in accordance with some embodiments.

FIG. 3 illustrates an example embodiment of a single-stator curvilinear electromagnetic pump 300. In some cases, the curvilinear electromagnetic pump 300 is made up of multiple discrete straight segments 302(1), 302(2), 302(n) that are coupled together and offset by an angle relative to adjacent sections. In some cases, the segments 302(1) include a plurality of coil packs 304(1), 304(2), 304(n), that are angled relative to each other. In some cases, the relative angle may be between 5° and 30° or on the order of 5°, or 8°, or 10°, or 12°, or 15°, or 20°, or 30° or more. As used herein, the term "curvilinear" is a broad term. Where it is used to describe an electromagnetic pump, its use refers to a pump having two or more straight segments having centerlines that are not colinear. For example, when referring to embodiments of a pump as described herein, "curvilinear" or "curved" refers to multiple straight segments that are offset by an angle with respect to each other. In some cases, multiple pump segments are offset with respect to each other and are described as defining a curve or an arc. In this case, it is to be understood that the pump segments may be straight but are offset with respect to each other by an angle to cause a fluid flowing through the pump to change direction as it flows therethrough. In some cases, the electromagnetic pump sections may be curved, or the electromagnetic pump may be comprised of linear sections that are offset by an angle with respect to adjacent sections. In either case, the electromagnetic pump may be described as "curved," "following a curve," "defining a curve," or "curvilinear."

A pump housing 306 may be provided to contain the segments 304(2) and the pump housing 306 may likewise be segmented with angles corresponding to the angular offset of the adjacent coil packs. In some cases, the pump housing 306 is shaped with a smooth curve, which may have a constant radius in some embodiments. In some cases, the pump housing 306 follows a smooth curve while the segments 304 within the housing may each define a straight flow path. In some cases, the segments 304 each define a centerline and the centerlines of the segments 304 are not colinear from one segment to the next.

In some instances, the segments 302(1), 302(2) may be coupled through any suitable method or mechanism and may include welding, mechanical fasteners, or other coupling methods, and may further any suitable sealers to promote a fluid tight coupling to increase pump efficiency.

Any number of coil packs 304(1) may be provided, and in some embodiments, six coil packs per segment 302(1) are provided. In some cases where three-phase power is supplied, a six-coil pack segment 302(1) will provide one complete revolution of the magnetic field to drive the electrically conductive fluid through the segment 302(1). Of course, any suitable number of coil packs per segment may be used, such as, for example, 2, 3, 6, 9, 12, or more.

While the illustrated embodiment shows a single-stator configuration, it is contemplated that a dual-stator configuration is entirely possible and will function, mutatis mutandis, in the same way.

Figure 4:
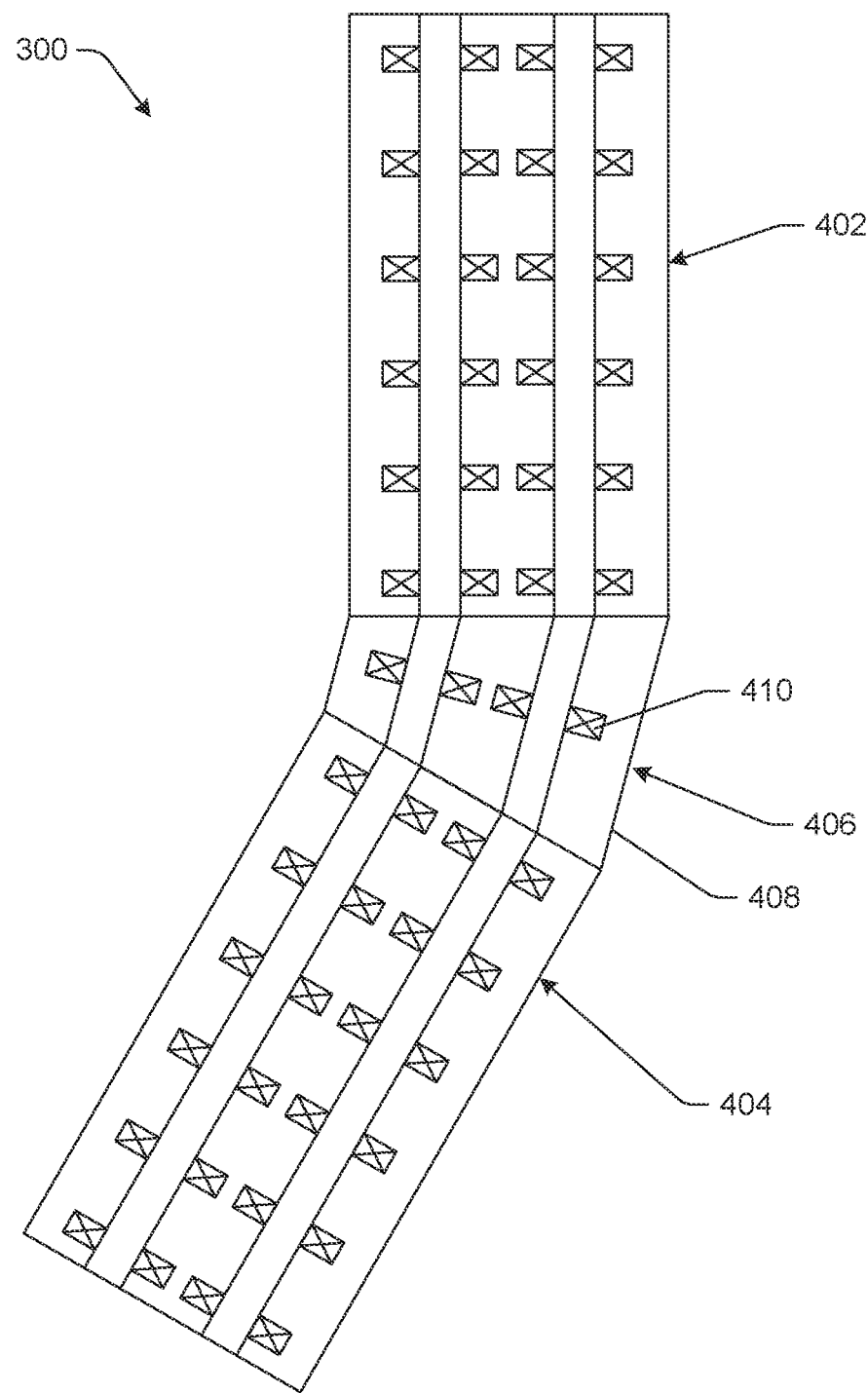
FIG. 4 illustrates a schematic representation of a curvilinear electromagnetic pump having a coupler between adjacent pump sections, in accordance with some embodiments.

FIG. 4 illustrates a portion of a double-stator curvilinear electromagnetic pump 300 in which a first segment 402 is connected to a second segment 404 by a coupler 406. In some cases, the coupler 406 may be wedge-shaped and define a predetermined angle, such that when the coupler 406 is used to connect the first segment 402 and the second segment 404, the segments are angled relative to each other. While the figure illustrates a double-stator pump, it should be appreciated that a single-stator pump could be used in a similar manner and function in a similar way.

In some cases, the construction and configuration of the coupler 406 is similar to that of the first segment 402 and/or the second segment 404. For example, the coupler 406 may have a pump housing 408 having a similar, or the same, cross-sectional shape and size. The coupler 406 may additionally define a flow channel that is in fluid communication with the first segment 402 and the second segment 404. Similarly, the coupler 406 may optionally include one or more coil packs 410 that can be energized to drive fluid therethrough. The coil packs in the coupler 406 may be electrically driven in sequence with the coil packs present in the segments 402, 404, such that the magnetic field passes sequentially from the first segment 402, through the coupler 406, and to the second segment 404.

In some cases, the coupler 406 may not include coil packs, and the electrically conductive fluid flows through the coupler 406 by fluid inertia, by a positive driving pressure upstream of the coupler 406, a lower pressure downstream of the coupler 406, or a combination of forces.

The coupler 406 may be connected to the first segment 402 through any suitable method or structure, and may include, without limitation, welding, bolts, fasteners, adhesives, clamps, or any other suitable connection method. The offset between a first segment 402 and a second segment 404 may be any suitable offset angle. In some cases, the offset angle is about 3°, 5°, 8°, 10°, 12°, 15°, 18°, 20°, or more.

Figure 5:
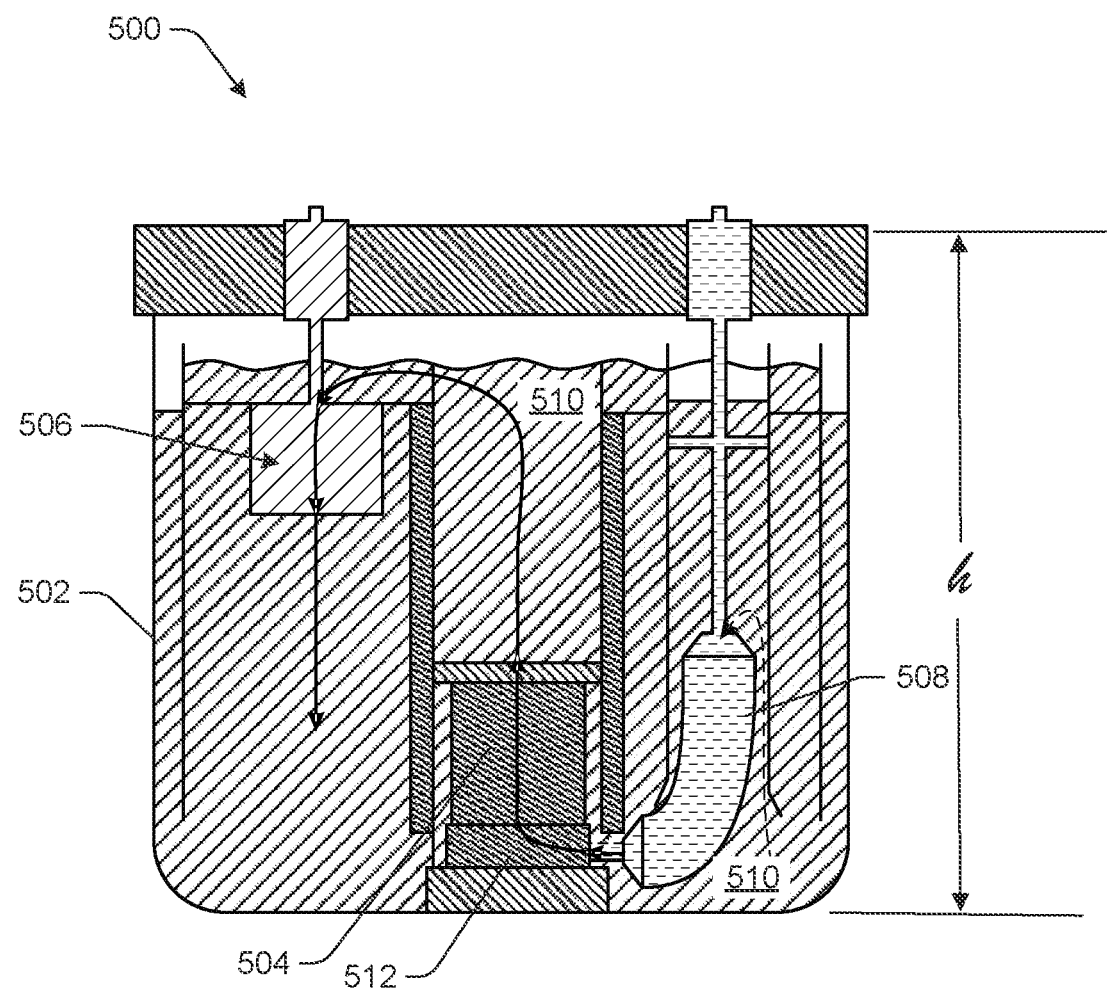
FIG. 5 illustrates a schematic representation of a nuclear reactor utilizing a curvilinear electromagnetic pump curving in a vertical plane, in accordance with some embodiments.

FIG. 5 illustrates a schematic representation of a nuclear reactor 500 having a reactor vessel 502, a reactor core 504, a heat exchanger 506, and a curvilinear electromagnetic pump 508. Of course, the schematic representation omits many of the structures and components typically found within a reactor, but rather, illustrates a primary coolant flow path.

Primary coolant within a cold pool 510 may be drawn into the pump 508 where it is driven to an inlet 512 of the reactor core 504. The coolant is heated within the reactor core 504 and exits into a hot pool 514 where it enters the heat exchanger 506. The coolant exits the heat exchanger 506 into the cold pool to complete the cycle.

Providing for a curvilinear electromagnetic pump 508 provides several advantages. For example, a curvilinear electromagnetic pump 508 allows for much greater flexibility in the placement of the electromagnetic pump 508 within the reactor vessel 502, it allows the reactor vessel 502 to be significantly smaller compared to an arrangement using a linear induction pump that is arranged vertically, and it allows for greater flexibility in placing other components within the reactor vessel 402. For example, in the configuration shown in which the curvilinear electromagnetic pump 508 curves in a single direction within a vertical plane, and assuming that the pump is configured to traverse a 90° arc, the overall height of the pump 508 may be reduced by up to about 40% as compared to a same-length linear electromagnetic pump that is arranged vertically. Consequently, the height of the reactor vessel h may be reduced a corresponding amount. Of course, other locations and arrangements of the curvilinear electromagnetic pump 508 are possible and contemplated to result in even further advantages.

Figure 6A:
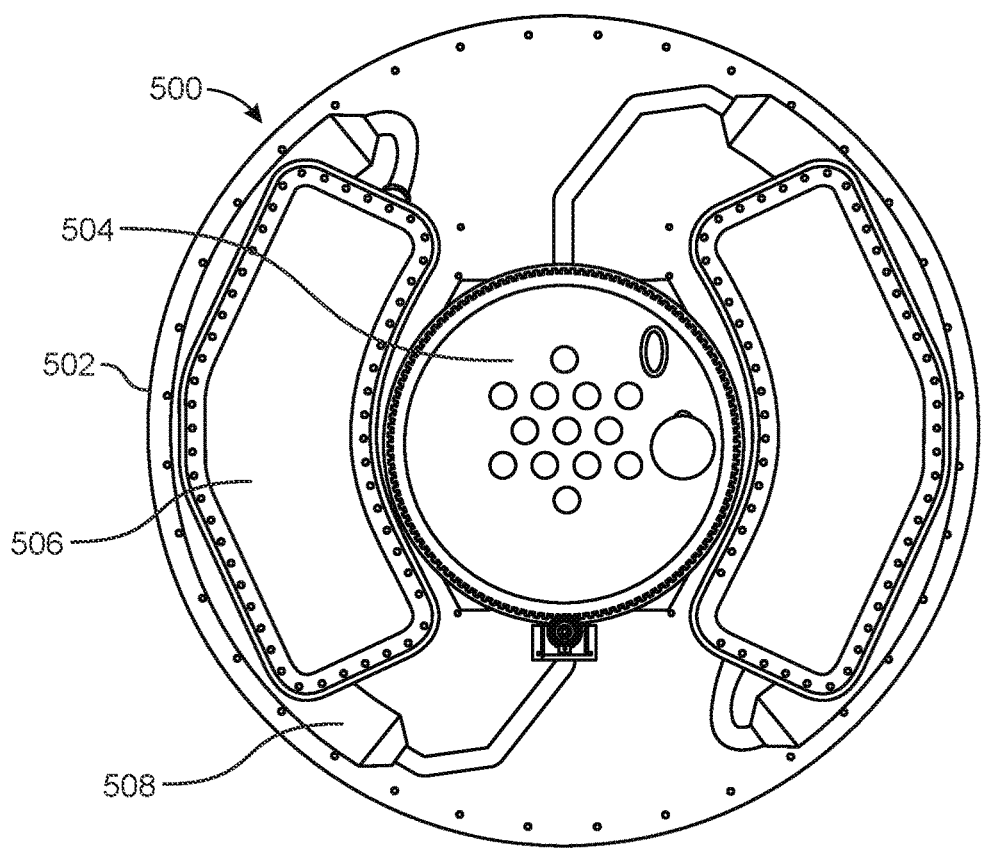
FIG. 6A illustrates a top view schematic representation of a nuclear reactor vessel showing a curvilinear electromagnetic pump curving in a horizontal plane, in accordance with some embodiments.
Figure 6B:
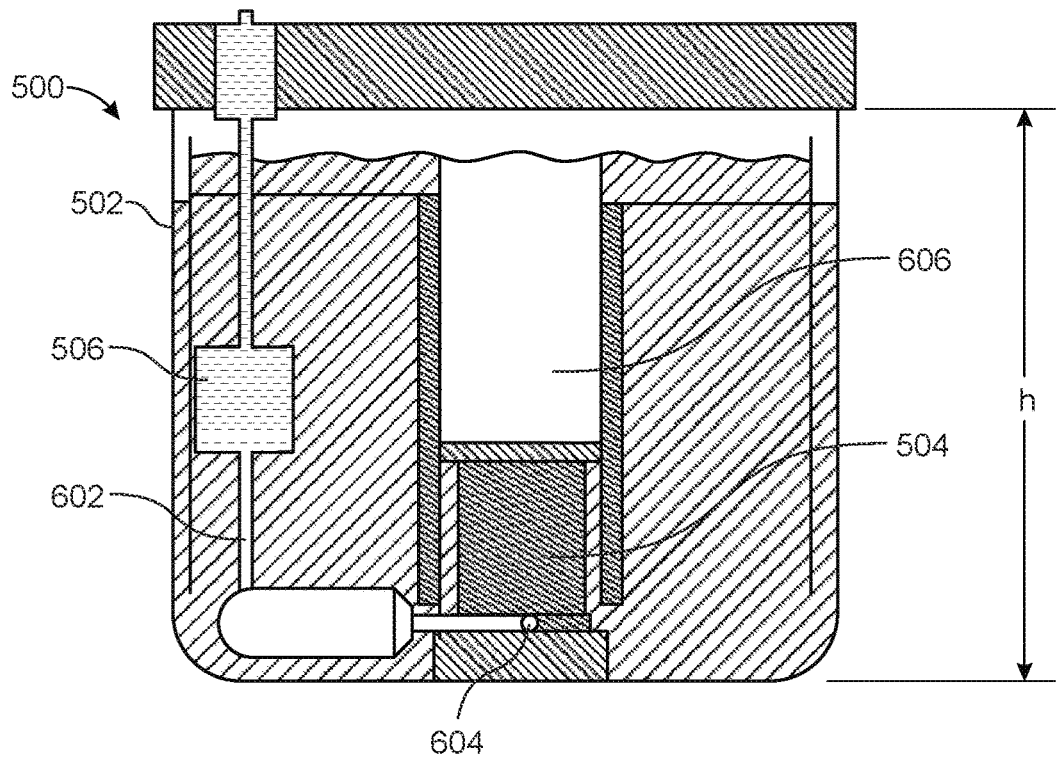
FIG. 6B illustrates a side view schematic representation of a nuclear reactor vessel showing a curvilinear electromagnetic pump curving in a horizontal plane, in accordance with some embodiments.

FIGS. 6A and 6B schematically illustrate an embodiment of a nuclear reactor vessel 500 in which a curvilinear electromagnetic pump 508 has been arranged horizontally. As illustrated, the curvilinear electromagnet pump 508 can be shaped to follow the curvature of the reactor vessel 502. In some embodiments, the electromagnetic pump 508 can be located near the bottom of the reactor vessel 502. Accordingly, the inlet to the electromagnetic pump 506 and the outlet from the electromagnetic pump 506 are both located near the bottom of the reactor vessel 502. Notably, the pump configurations described herein allow one or more heat exchangers 506 to be located much lower within the reactor vessel 502 in comparison with a vertically oriented pump. For instance, where the electromagnetic pump 506 does not require a substantial amount of vertical space within the reactor vessel 502, the heat exchangers 506 may be placed lower within the reactor vessel. In some cases, the bottom of the heat exchanger is located below the top of the reactor core 504.

The curvilinear electromagnetic pump 508 may extend a distance around the periphery of the reactor vessel 502, and in some cases may follow roughly an arc shape of about 90° to about 120°. In some cases, one or more electromagnetic pumps 508 are arranged at a location near the bottom of the reactor vessel and may each extend in an arc about 45°, or 90°, or 120°, or some other suitable arc angle near the wall of the reactor vessel 502 and may generally follow the curvature of the reactor vessel wall.

In some embodiments, one or more curvilinear electromagnetic pumps 508 are oriented horizontally within the reactor vessel 502. In other words, one or more electromagnetic pumps 506 define at least a portion of a fluid flow path that lies within a horizontal plane. In some embodiments, one or more curvilinear electromagnetic pumps 508 define a flow path that approximates a curved outer wall of the reactor vessel 506. In some cases, the reactor vessel 502 may define a geometric center 606, and the curvilinear electromagnetic pump 508 may lie entirely below the geometric center 606 of the reactor vessel 506. In some cases, the inlet 602 and the outlet 604 are positioned below the geometric center 606 of the reactor vessel 502.

As illustrated, the electromagnetic pump 508 may be arranged so an intake 602 is in fluid communication with the heat exchanger 506. The outlet 604 may be in fluid communication with the reactor core 504, such as by being fluidically coupled to an inlet plenum of the reactor core 504. In this configuration, the electromagnetic pump 508 occupies very little vertical space within the reactor vessel 502, and the height h of the reactor vessel 502 may be substantially smaller than a reactor vessel in which a linear electromagnetic pump is disposed vertically.

Figure 7A:
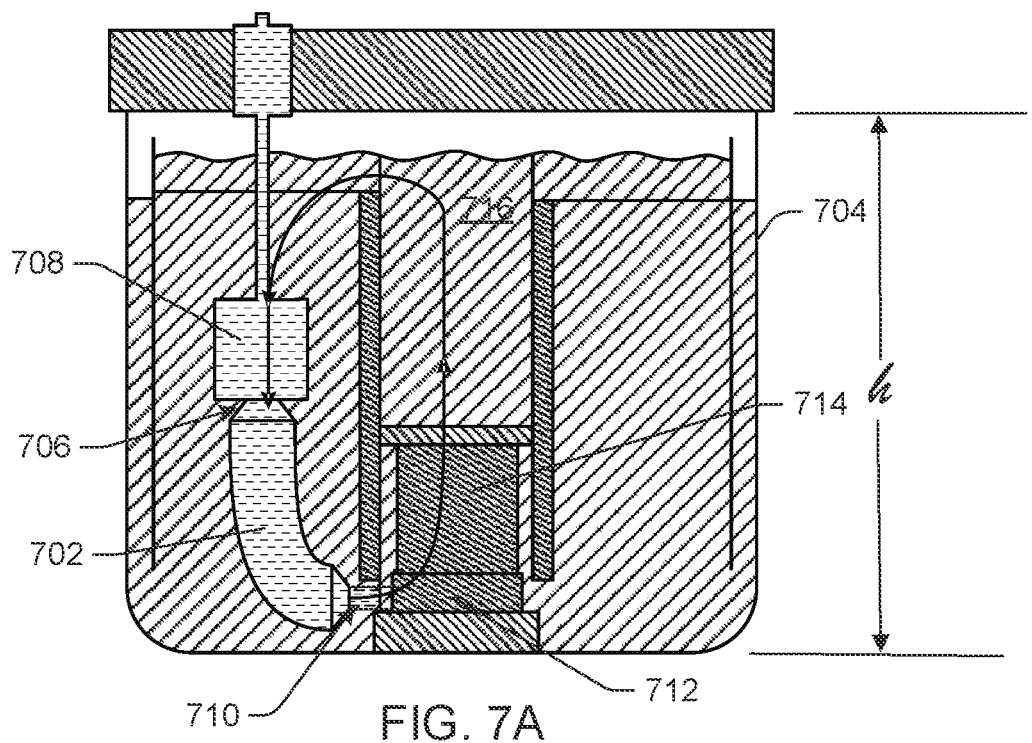
FIG. 7A illustrates a side view schematic representation of a nuclear reactor vessel showing a curvilinear electromagnetic pump curving in 3-dimensions, in accordance with some embodiments.
Figure 7B:
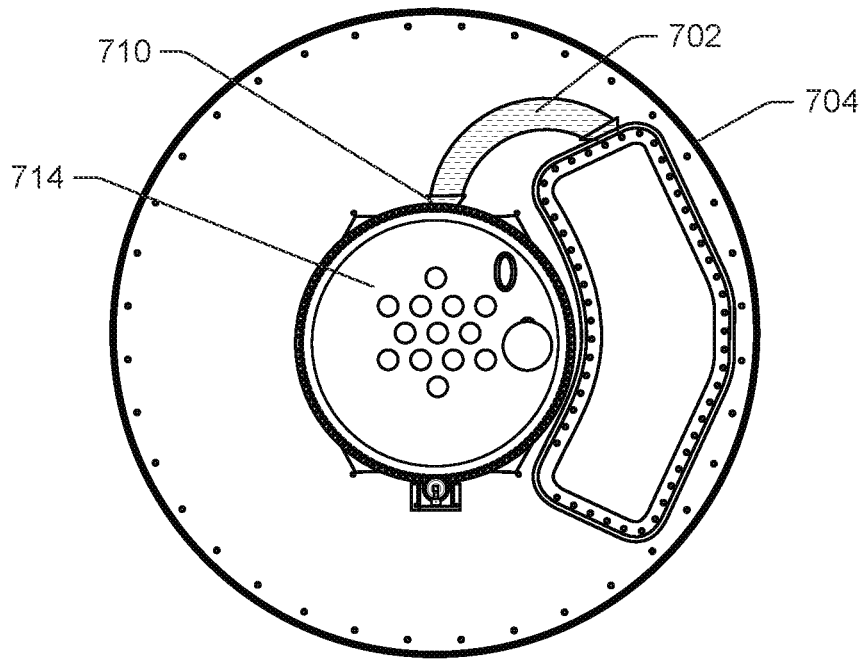
FIG. 7B illustrates a top view schematic representation of a nuclear reactor vessel showing a curvilinear electromagnetic pump curving in 3-dimensions, in accordance with some embodiments.

FIGS. 7A and 7B schematically illustrate further configurations of a curvilinear electromagnetic pump 702 disposed within a reactor vessel 704. According to some examples, a curvilinear pump may be described as defining a plane curve. In other words, a centerline of the curvilinear electromagnetic pump may lie in a single plane, even though the centerline may define a curve. In some cases, a curvilinear electromagnetic pump may curve in more than one dimension. In other words, a centerline of the curvilinear electromagnetic pump 702 may not lie in a single plane. As illustrated, the curvilinear electromagnetic pump 702 may curve in multiple directions. In some cases, a centerline of the curvilinear electromagnetic pump 702 may lie in three dimensions. For example, a centerline of the curvilinear electromagnetic pump 702 may be helical. In any event, a curvilinear electromagnetic pump 702 may curve in more than one direction, as illustrated.

The curvilinear electromagnetic pump 702 may have an inlet 706 in fluid communication with a heat exchanger 708. The curvilinear electromagnetic pump 702 may have an outlet 710 near a reactor core plenum 712 that is in fluid communication with the nuclear reactor core 714. In some cases, the reactor vessel 704 has a generally cylindrical shape, and the curvilinear electromagnetic pump 702 may generally follow the curvature of the reactor vessel 704.

In operation, the curvilinear electromagnetic pump 702 drives cooled fluid into the reactor core 714 where it becomes heated through fission reactions occurring within the reactor core 714. The heated fluid travels upwardly out of the core to a hot pool 716 where it is drawn into one or more heat exchangers 708. The fluid cools as it passes through the heat exchanger 708 and is drawn into the curvilinear electromagnetic pump 702 as it exits the heat exchanger 708.

In the configuration shown, the curvilinear electromagnetic pump 702 requires substantially less vertical space within the reactor vessel 704 as compared to a linear electromagnetic pump of the same length arranged vertically. The result is that the reactor vessel 704 can be sized to have a height h that is significantly less than prior reactor vessels. Moreover, a curvilinear electromagnetic pump 702 provides for a much wider range of design and layout options for components and systems within the reactor vessel 704.

According to some embodiments, a curvilinear electromagnetic pump 702 may comprise one or more lengths that are relatively straight in combination with one or more lengths that are curvilinear. In some cases, a curvilinear flow path is defined by individual straight segments of a linear induction pump that are offset relative to each other and are coupled by conduits that connect the outlet of one segment with the inlet of another segment.

In some cases, a curvilinear electromagnetic pump 702 may lie substantially in a horizontal plane, but have an elevated upstream intake end. For example, the curvilinear electromagnetic pump 702 may have an inlet end at a higher elevation than an outlet end. The curvilinear electromagnetic pump 702 may be disposed at a location near the bottom of the reactor vessel, and extend around the inner circumference of the reactor vessel in an arc, such as about 100°, or 120°, or 130°, or 140° or 150°. In some cases, multiple curvilinear electromagnetic pumps 702 are disposed near the bottom of the reactor vessel 704 and follow the curvature of the reactor vessel wall 704. In some instances, a first curvilinear electromagnetic pump 702 may partially overlap a second curvilinear electromagnetic pump 702. For example, where the curvilinear electromagnetic pumps 702 have an inlet end at a higher elevation than an outlet end, the inlet end of a first pump 702 may be disposed above the outlet end of a second pump 702. This arrangement allows a plurality of curvilinear electromagnetic pumps to lie substantially in a horizontal plane, but define flow paths that form an arc greater than 360°. As an example, four curvilinear electromagnetic pumps may be located near the bottom of the reactor vessel, and each pump may define a flow path that traverses an arc of 120°. In order to avoid interference between adjacent pumps, the inlet end of each pump may be elevated above the outlet of an adjacent pump, such that the pump flow paths partially overlap in vertical space. The pumps will define three-dimensional curvatures, but allows the pumps to be sized to any suitable length while still allowing a substantially horizontal flow path near the bottom of the reactor vessel.

In some cases, an outlet from a heat exchanger is bifurcated and enters more than one curvilinear electromagnetic pump 702. Therefore, in some cases, there are more electromagnetic pumps 702 than there are heat exchangers within the reactor vessel 704.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and drawings disclose examples of systems, apparatus, devices, and techniques that may allow modules of a nuclear reactor to be fabricated in a manufacturing facility and shipped to a construction site, where the modules can be assembled, thereby greatly reducing on-site fabrication complexity and cost. Further, the systems of the nuclear reactor have been simplified and further promote factory fabrication in lieu of on-site fabrication.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A curvilinear electromagnetic pump, comprising:
    a first pump section, the first pump section comprising:
        a first pump housing defining a pump inlet,
        a first linear fluid flow channel through the first pump housing, and
        a first collection of outer stators, the first collection of outer stators configured to be electrically driven to create a moving magnetic field;
    a second pump section, the second pump section comprising:
        a second pump housing defining a pump outlet,
        a second linear fluid flow channel, and
        a second collection of outer stators, the second collection of outer stators configured to be electrically driven to create the moving magnetic field; and
    wherein the second pump section is coupled to the first pump section and is offset by an angle with respect to the first pump section,
    wherein the curvilinear electromagnetic pump is positioned within a nuclear reactor vessel and a fluid flow path of the curvilinear electromagnetic pump is configured to follow a circular arc of an outer wall of the nuclear reactor vessel in a circumferential direction, and
    wherein the pump inlet is configured to be disposed at a location within the nuclear reactor vessel that is higher in elevation than the pump outlet.

2. The curvilinear electromagnetic pump as in claim 1, further comprising a coupler, the coupler configured to fluidically connect the first pump section and the second pump section together at the angle.

3. The curvilinear electromagnetic pump as in claim 2, wherein the coupler comprises a third collection of outer stators, the third collection of outer stators configured to be driven sequentially with the first collection of outer stators and the second collection of outer stators to cause the moving magnetic field to travel along the first pump section, the coupler, and the second pump section.

4. The curvilinear electromagnetic pump as in claim 1, wherein the first linear fluid flow channel is in fluid communication with the second linear fluid flow channel.

5. The curvilinear electromagnetic pump as in claim 1, wherein the angle is from 5° to 30°.

6. The curvilinear electromagnetic pump as in claim 1, wherein the first pump section further comprises a first collection of inner stators and the second pump section further comprises a second collection of inner stators.

7. The curvilinear electromagnetic pump as in claim 1, wherein the nuclear reactor vessel defines a geometric center, and wherein the curvilinear electromagnetic pump is entirely disposed below the geometric center.

8. The curvilinear electromagnetic pump as in claim 1, wherein the curvilinear electromagnetic pump has an inlet in fluid communication with a heat exchanger and an outlet in fluid communication with an inlet plenum of a reactor core.

9. The curvilinear electromagnetic pump as in claim 1, further comprising a third pump section, the third pump section comprising:
   a third pump housing,
   a third linear fluid flow channel, and
   a third collection of outer stators,
   wherein the third pump section is coupled to the second pump section and is offset by the angle with respect to the second pump section.

10. The curvilinear electromagnetic pump as in claim 9, wherein a centerline of the curvilinear electromagnetic pump is not planar.

11. The curvilinear electromagnetic pump as in claim 1, wherein the curvilinear electromagnetic pump is disposed within the nuclear reactor vessel in a bottom portion of the nuclear reactor vessel.

* * * * *